UNITED STATES PATENT OFFICE.

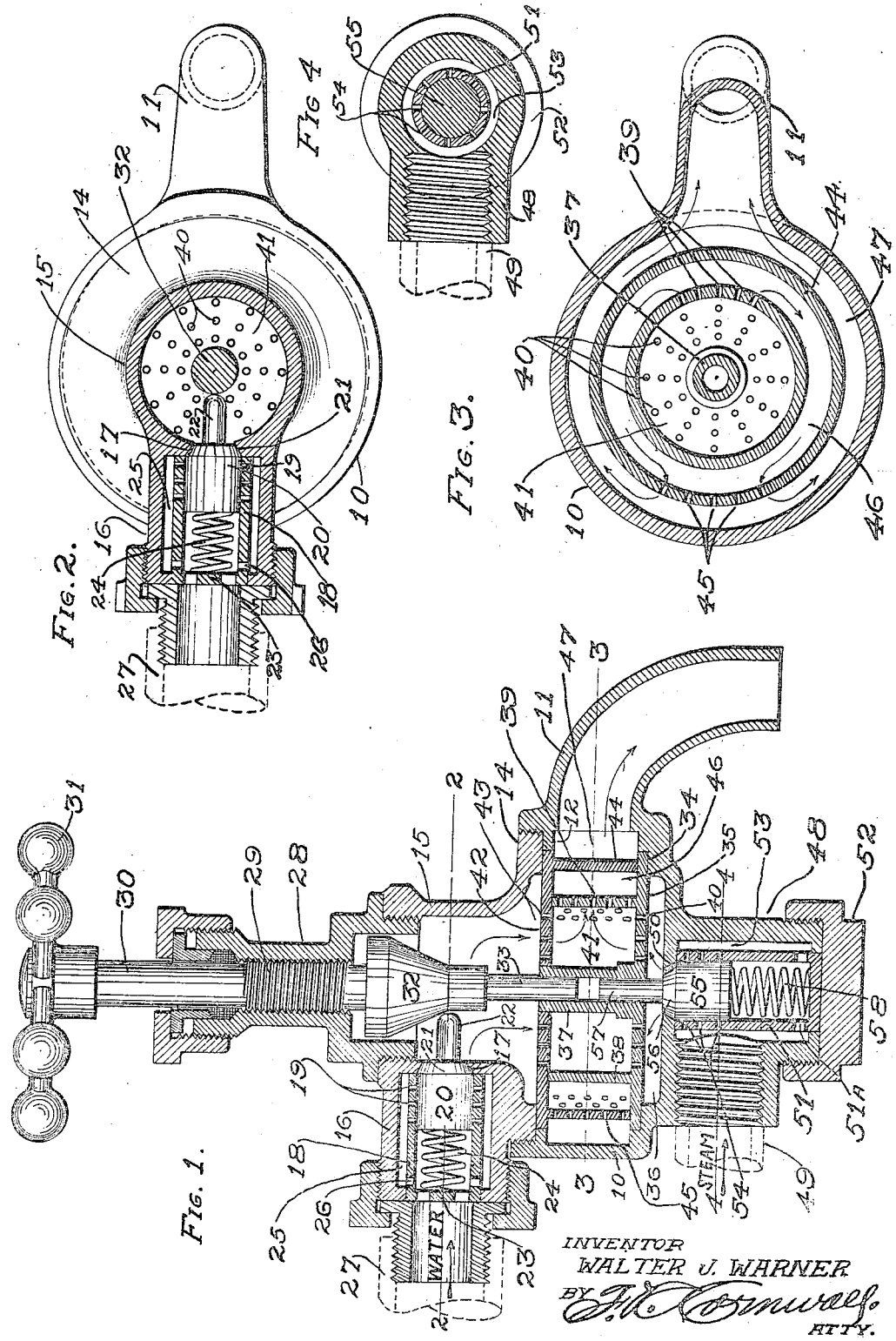

WALTER J. WARNER, OF ST. LOUIS, MISSOURI.

WATER-HEATER.

1,256,853.  Specification of Letters Patent.  Patented Feb. 19, 1918.

Application filed July 19, 1916. Serial No. 110,177.

*To all whom it may concern:*

Be it known that I, WALTER J. WARNER, a citizen of the United States, residing at St. Louis, Missouri, have invented a certain new and useful Improvement in Water-Heaters, of which the following is a full, clear, and exact description, such as will enable others skilled in the art to which it appertains to make and use the same, reference being had to the accompanying drawings, forming part of this specification.

My invention relates to a device particularly designed for heating water by the mixing therewith of live steam, the subject matter of this application being an improvement on the water heaters disclosed in my applications for patent filed April 27, 1916, Serial Number 94,067, and May 15, 1916, Serial Number 97,598.

The principal objects of my invention are to generally improve upon and simplify the construction of the water heating devices disclosed in the aforesaid applications, and to provide a comparatively simple, inexpensive and easily operated water heating device which can be advantageously and economically used wherever live steam and water are available, the operation or action of said device being practically instantaneous, thereby making it particularly desirable for use in kitchens, laundry, bath and wash rooms, and for manufacturing processes.

Further objects of my invention are to provide a water heating device having the form of a valve with a single discharge spout or nozzle and with a rotating valve stem which controls the opening movements imparted to both water and steam valves within the housing or body of the device; further, to construct a water heater so that the live steam utilized for heating the comparatively cold water is divided into small jets and thoroughly mixed and commingled with the entire body of water flowing through the device, thereby effectually heating said water; and further, to provide a device wherein the operating parts are arranged so that the opening movement is first imparted to the water control valve, and then to the steam control valve, with the result that unheated water can be obtained by a partial movement of the valve stem and partially heated, or warm water can be obtained by a further partial movement of the valve stem.

Further objects of my invention are to provide a water heating device wherein the normal pressure of the water and steam is utilized for maintaining the water and steam inlet valves in closed positions, and which provision, together with the peculiar construction of the valves themselves, reduces to a minimum the liability of leakage of water and steam through the device.

With the foregoing and other objects in view, my invention consists in certain novel features of construction and arrangement of parts hereinafter more fully described, claimed, and illustrated in the accompanying drawings in which—

Figure 1 is a vertical section taken through the center of a water heating device of my improved construction.

Fig. 2 is a horizontal section taken approximately on the line 2—2 of Fig. 1.

Fig. 3 is a horizontal section taken approximately on the line 3—3 of Fig. 1.

Fig. 4 is a horizontal section taken approximately on the line 4—4 of Fig. 1.

By referring to the drawings which illustrate a practical embodiment of my invention, it will be noted that the main body of the device is formed in two parts, the lower one 10 of which is in the form of a hollow cup-shaped member preferably cast, from the front side of which leads outwardly and downwardly a tubular nozzle or discharge spout 11.

Formed integral with the upper portion of the vertical wall of the member 10 is an inwardly projecting flange 12 and the wall above this flange is internally threaded in order to receive an externally threaded flange 14 which is formed on the upper body member 15. This upper body member which is preferably cast comprises a vertically disposed tubular portion, the upper end of the wall of which is internally threaded and formed integral with said upper body member and projecting rearwardly therefrom is a horizontally disposed tubular member 16, the outer end of which is externally threaded. The outer end of the tubular member 16 is open and formed through the wall between the chambers within the members 15 and 16 is an opening 17, the edge of which is preferably beveled in order to form a valve seat.

Removably positioned in the chamber within the hollow member 16 is a cylindrical member 18, the inner open end of which bears directly against the wall between the members 15 and 16 around the opening therein.

The inner portion of the wall of the cylindrical member 18 is perforated as designated by 19 and arranged to fit snugly and slide within the inner portion of said cylindrical member is a valve plug 20, the inner end of which is beveled as designated by 21 in order to fit snugly against seat 17. This valve plug is provided with a pin 22 which projects into the chamber within upper body member 15. The length of the valve plug 20 is such that all of the apertures 19 are covered or closed when said valve plug is in its normal closed position with the beveled face 21 bearing on valve seat 17.

The outer end of cylindrical member 18 is provided with a perforated wall 23 and interposed between said wall and the valve plug 20 is a compression spring 24. The external diameter of cylindrical member 18 is less than the diameter of the chamber within member 16, and thus an annular chamber 25 is formed between the wall of member 16 and the wall of said cylindrical member 18.

Formed through the wall of member 18 near its outer end is a series of apertures 26 which establish communication between the annular chamber 25 and the chamber within member 18.

Detachably connected in any suitable manner to the outer end of member 16 is a water supply pipe 27.

Screw-seated in the upper end of upper body member 15 is the lower end of a tubular member 28, the same being internally threaded in order to receive the threaded portion 29 of a valve operating handle 30. The upper end of this rod is provided with a suitable handle 31 and formed integral with or fixed to said rod in the chamber within member 15 is a conical head 32 against which the end of pin 22 normally bears. Depending from this head 32 is a pin 33.

That portion of the bottom plate of lower body member 10 immediately adjacent to the vertical wall thereof is slightly elevated with respect to the central portion of said bottom plate and formed in the top of said elevated portion is an annular groove 34, the same serving as a seat for the edge of a plate 35. The space between this plate and the depressed central portion of the bottom plate of member 10 provides a shallow chamber 36.

Formed integral with or fixed to the plate 35 is a centrally arranged vertically disposed tubular member 37 in the upper portion of which the lower end of pin 33 is normally positioned.

Formed integral with or fixed to plate 35 and at a point between the tubular member 37 and the edge of said plate is an annular vertically disposed wall 38, the front of which or that portion adjacent to the upper end of outlet 11 is perforated as designated by 39. That portion of plate 35 between the annular wall 38 and tubular member 37 is perforated as designated by 40, thus establishing communication between the shallow chamber 36 and the chamber 41 within wall 38.

Positioned on top of wall 38 with its edge bearing against flange 12 is a plate 42, the central portion of which is perforated as designated by 43 in order to establish communication between the chamber within member 15 and the chamber 41. Formed in the center of this plate 42 is an opening which receives the upper end of tubular member 37.

Formed integral with plate 42 and near the edge thereof is a depending annular wall 44, the rear portion of which is perforated as designated by 45. The lower end of wall 44 bears directly upon plate 35 near its edge, and when the parts 10 and 15 forming the body of the device are properly assembled, the plates 35 and 42 are firmly held in position within the member 10.

The wall 44 divides the space between wall 38 and the vertical wall of housing 10 into an inner annular chamber 46 and an outer annular chamber 47, said chambers being concentric with each other and with the circular chamber 41 within wall 38, and said outer annular chamber 47 communicates directly with the passageway through outlet 11.

Depending from the bottom plate of lower body member 10 is a vertically disposed cylindrical member 48, into the rear side of which is tapped a pipe 49 leading from a suitable source of steam supply.

Formed in the center of the bottom plate of member 10 is an opening 50, the same being preferably beveled to form a valve seat, said opening establishing communication between the space within member 48 and the shallow chamber 36 in the lower portion of member 10.

The lower end of member 48 is open and removably positioned within said member is a cylindrical member 51, the upper end of which bears against the underside of the bottom plate of member 10 around the opening 50 therein. This cylindrical member 51 is held in fixed position within member 48 by a cap 52, the same being screwed onto the externally threaded lower end of member 48.

The external diameter of member 51 is less than the diameter of the chamber within member 48, and thus an annular chamber 53 is formed between said parts.

The upper portion of the wall of member 51 is perforated as designated by 54 in order to establish communication between chamber 53 and the chamber within member 51 and fitting snugly and arranged for sliding movement in the upper portion of said member 51 is a valve plug 55 provided at its upper end with a beveled face 56 which normally fits snugly against the seat formed by opening 50.

Projecting upwardly from valve plug 55 is a pin 57, the same occupying the lower portion of the opening through member 37 and the upper end of this pin is normally positioned a short distance away from the lower end of pin 33.

Formed through the lower portion of the wall of cylindrical member 51 are apertures 51$^a$ which establish communication between chamber 53 and the chamber within said cylindrical member.

Interposed between the bottom of member 51 and the underside of valve plug 55 is a compression spring 58.

The operation of my improved device is as follows:

Under normal conditions or when the valves of the device are closed, the various operating parts occupy the positions illustrated in Fig. 1.

Water enters the chamber within cylindrical member 18 through the apertures 26 and assists the spring 24 in retaining the valve plug 20 in closed position, and likewise the pressure of the steam entering chamber 53 through steam connection 49 passes through the perforations 51$^a$ in the lower portion of cylinder 51, thereby assisting spring 58 in holding valve plug 55 in closed position.

To open the valves, shaft 30 is rotated by manipulating handle 31, and during such rotation, said shaft moves gradually downward with the result that the inclined face of conical member 32 bears against the outer end of pin 22, thereby forcing said pin and valve plug 20 rearwardly through cylindrical member 18 against the resistance offered by spring 24 and the water pressure to the rear of the valve. This movement of the valve plug simultaneously uncovers the opening 17 and the row of apertures 19 immediately adjacent to said opening, with the result that water will flow from chamber 25 through the uncovered openings 19, from thence through openings 17 to chamber within housing 15, and from thence downward through perforations 43, chamber 41, perforations 39, chamber 46, perforations 45, to chamber 47, and from thence out through spout or discharge outlet 11.

It will be understood that pipe 27 under ordinary circumstances is connected to the regular service pipe and consequently when the device is first opened, comparatively cool water will discharge from the spout 11 and consequently it will be impossible for the user of the valve to be burned or scalded with hot water, which would be the case in the event that the steam valve were opened simultaneously with the water control valve.

Continued rotation of the shaft 30 and the simultaneously downward movement thereof will move the lower end of pin 33 into engagement with the upper end of pin 57 and as the downward movement of the parts continues, valve plug 55 controlling the flow of steam to the device will be moved downward, thereby uncovering opening 50 and the row of apertures 54 immediately adjacent to said opening. This movement of the parts permits steam entering chamber 53 through supply pipe 49 to pass through the uncovered apertures 54 and opening 50 into chamber 36, from thence upward through the apertures 40 in plate 35 and thus the steam is delivered in jet form into the chamber 41 to mix with and heat the water entering said chamber through the apertures 43. This mixture of water and steam finds exit through the apertures 39 in front of wall 38, and is thus delivered in jet form into the annular chamber 46 and passing rearwardly through said chamber, the mixture finds exit through the apertures 45, and thus is delivered in jet form into annular chamber 47.

After passing forwardly through this chamber, the water finds exit through the spout or outlet 11.

By dividing the steam and water into jets and causing the mixture to take a backward and forward path of travel through the annular chambers 46, and 47, a very thorough mixture of the steam with the water is obtained with the result that the water absorbs the heat contained in the steam, and consequently the water in a heated condition finally discharges from the spout or outlet 11.

In the event that it is desired to heat the water to a comparatively high degree, shaft 30 is moved downward until valve plug 55 is moved to such a position as to uncover all of the apertures 54, and as a result, a comparatively large flow of steam is permitted to enter the mixing chamber and consequently the water will be heated to a considerable degree.

The device is closed by reversing rotating shaft 30 and as such action takes place, the springs behind the valve plugs force the latter to their seats, thereby cutting off the further passage of water and steam through the device.

The inclination of the face of the conical member 32 regulates the opening movement imparted to valve plug 20 and the distance between the ends of pins 33 and 57 regulates the time of the opening movement imparted to valve plug 55 relative to the opening movement imparted to said water control valve plug 20.

A water heating device of my improved construction is comparatively simple, is very compact, presents a neat and finished appearance, can be readily connected to steam and water pipes already in service, provides for the thorough and effective mixing and commingling of steam and water to quickly and thoroughly heat the latter, and said device can be advantageously and economically employed wherever hot water is necessary or desirable and live steam and water are available.

It will be readily understood that minor changes in the size, form and construction of the various parts of my improved water heating device can be made and substituted for those herein shown and described, without departing from the spirit of my invention, the scope of which is set forth in the appended claims.

I claim:

1. In a water heater, a housing having a mixing chamber and a pair of valve chambers, there being openings from the valve chambers into the mixing chamber, a sleeve within each valve chamber, each sleeve being provided with perforations adjacent to the end which communicates with the opening from the corresponding valve chamber into the mixing chamber, a valve fitting snugly within each sleeve, each valve normally closing the perforations in the inclosing sleeve and the opening from the corresponding valve chamber into the mixing chamber, a longitudinally movable member, means carried thereby for engaging and unseating one of the valves, and said member being adapted to unseat the other valve by its longitudinal movement.

2. In a water heater, a housing having a mixing chamber and a pair of valve chambers, there being openings from the valve chambers into the mixing chamber, a sleeve within each valve chamber, each sleeve being provided with perforations adjacent to the end which communicates with the opening from the corresponding valve chamber into the mixing chamber, a valve fitting snugly within each sleeve, each valve normally closing the perforations in the inclosing sleeve and the opening from the corresponding valve chamber into the mixing chamber, a longitudinally movable member, means carried thereby for engaging and unseating one of the valves, said member being adapted to unseat the other valve by its longitudinal movement, said mixing chamber being provided with an outlet, a pair of perforated plates within the mixing chamber on opposite sides of the outlet, and a series of concentrically arranged perforated plates disposed between said pair of plates.

3. In a water heater, a housing having a mixing chamber and a pair of valve chambers, there being openings from the valve chambers into the mixing chamber, a sleeve within each valve chamber, each sleeve being provided with perforations adjacent to the end which communicates with the opening from the corresponding valve chamber into the mixing chamber, a valve fitting snugly within each sleeve, each valve normally closing the perforation in the inclosing sleeve and the opening from the corresponding valve chamber into the mixing chamber, a longitudinally movable member, means carried thereby for engaging and unseating one of the valves, said member being adapted to unseat the other valve by its longitudinal movement, said mixing chamber being provided with an outlet, a pair of perforated plates within the mixing chamber on opposite sides of the outlet therefrom, an annular wall carried by each of said plates, a portion of each wall being perforated and one of said walls being smaller in diameter than and disposed within the other.

4. In a water heater, a housing provided with a mixing chamber, water and steam valve chambers on opposite sides of said mixing chamber, tubular connections to said valve chambers, valves for controlling the flow of water and steam from the valve chambers to the mixing chamber, a longitudinally movable member in the housing, a conical head carried thereby for directly engaging and unseating the water control valve, and said member being adapted to engage directly against the steam control valve for unseating the same.

5. In a water heater, a housing provided with a mixing chamber, water and steam valve chambers on opposite sides of said mixing chamber, tubular connections to said valve chambers, valves for controlling the flow of water and steam from the valve chambers to the mixing chamber, a longitudinally movable member in the housing, a conical head carried thereby for directly engaging and unseating the water control valve, said member being adapted to engage directly against the steam control valve for unseating the same, and a series of walls within the mixing chamber, portions of which walls are perforated.

6. In a water heater, a housing provided with a mixing chamber, water and steam valve chambers on opposite sides of said mixing chamber, tubular connections to said valve chambers, valves for controlling the flow of water and steam from the valve chambers to the mixing chamber, a longitudinally movable member in the housing, a conical head carried thereby for directly engaging and unseating the water control valve, said member being adapted to engage directly against the steam control valve for unseating the same, said mixing chamber being divided into a series of annular chambers, and means for causing the mixture and water to assume jet form in passing from one annular chamber to another.

7. In a water heater, a housing provided with a mixing chamber and a valve chamber, there being an opening from the valve chamber into the mixing chamber, a cylindrical member arranged within the valve chamber, the open end of which cylindrical member communicates directly with the opening from the valve chamber into the mixing chamber, there being a plurality of rows of apertures formed through the wall of the cylindrical member at different distances from the end which communicates with the opening into the mixing chamber, a valve mounted for sliding movement within the cylindrical member and adapted to normally close said rows of perforations in the cylindrical member and the passageway from the valve chamber to the mixing chamber, and a member for engaging and unseating the valve.

8. In a water heater, a housing provided with a mixing chamber and a valve chamber, there being an opening from the valve chamber into the mixing chamber, a cylindrical member within the valve chamber, the open end of which cylindrical member communicates directly with the opening from the valve chamber into the mixing chamber, said cylindrical member being smaller in diameter than the valve chamber so as to form an annular space around said cylindrical member, the wall of the cylindrical member being provided with annular rows of perforations, said rows being spaced apart and arranged at different distances from the end of the member which communicates with the opening to the mixing chamber, a spring-pressed valve fitting snugly within the cylindrical member and normally closing the rows of perforations therein and the opening from the valve chamber into the mixing chamber, and a member for directly engaging and unseating said valve.

9. In a water heater, a housing provided with a mixing chamber and a pair of inlet openings, one arranged on each side of the mixing chamber, said mixing chamber being provided with an outlet, valves controlling the inlet openings to the mixing chamber, a pair of perforated plates arranged within the mixing chamber between the inlet openings and the outlet opening, and a plurality of concentrically disposed annular walls between the perforated plates, portions of said annular walls being perforated.

In testimony whereof I hereunto affix my signature in the presence of two witnesses, this 10th day of July, 1916.

WALTER J. WARNER.

Witnesses:
LEM. R. SANDFORD,
F. M. RUMBOLD.

Copies of this patent may be obtained for five cents each, by addressing the "Commissioner of Patents, Washington, D. C."